United States Patent [19]

Kakabaker et al.

[11] Patent Number: 4,743,034
[45] Date of Patent: May 10, 1988

[54] LABYRINTH BEARING PROTECTOR SEAL

[75] Inventors: Kenneth G. Kakabaker, Kalamazoo; Duane A. Avard, Schoolcraft, both of Mich.

[73] Assignee: Durametallic Corporation, Kalamazoo, Mich.

[21] Appl. No.: 32,108

[22] Filed: Mar. 27, 1987

[51] Int. Cl.$^4$ ............................................. F16J 15/447
[52] U.S. Cl. ....................................... 277/53; 277/56; 277/24; 384/480
[58] Field of Search ............................ 277/24, 53–56, 277/59, 74, 79; 384/480

[56] References Cited

U.S. PATENT DOCUMENTS

| | | | |
|---|---|---|---|
| 976,400 | 11/1910 | Salzer | 277/53 X |
| 1,064,371 | 6/1913 | Perkins . | |
| 1,872,251 | 8/1932 | Cowin . | |
| 1,890,839 | 1/1932 | Young . | |
| 1,978,739 | 10/1934 | Brittain . | |
| 2,123,818 | 7/1938 | Wegmann . | |
| 2,281,905 | 5/1942 | Young . | |
| 2,524,124 | 10/1950 | Gyana . | |
| 2,608,423 | 8/1952 | Wilfley . | |
| 2,740,647 | 4/1956 | Van Pelt | 277/56 X |
| 2,894,769 | 7/1959 | Richmond et al. | 277/83 X |
| 3,343,891 | 9/1967 | Shipman | 277/55 X |
| 3,558,238 | 1/1971 | Van Herpt . | |
| 3,663,023 | 5/1972 | Leidenfrost . | |
| 3,774,982 | 11/1973 | Nakamura et al. | 384/480 |
| 3,843,065 | 10/1974 | Horstman et al. . | |
| 3,893,674 | 7/1975 | Paradine . | |
| 3,897,072 | 7/1975 | Inka et al. . | |
| 3,927,890 | 12/1975 | Adams . | |
| 4,022,479 | 5/1977 | Orlowski . | |
| 4,114,902 | 9/1978 | Orlowski . | |
| 4,175,752 | 11/1979 | Orlowski . | |
| 4,304,409 | 12/1981 | Orlowski . | |
| 4,466,620 | 8/1984 | Orlowski . | |
| 4,484,754 | 11/1984 | Ballard . | |
| 4,572,517 | 2/1986 | Rockwood et al. . | |

FOREIGN PATENT DOCUMENTS

| | | | |
|---|---|---|---|
| 479388 | 7/1929 | Fed. Rep. of Germany . | |
| 1057778 | 11/1953 | France | 384/480 |
| 484211 | 5/1938 | United Kingdom . | |
| 509935 | 7/1939 | United Kingdom . | |
| 653535 | 5/1951 | United Kingdom . | |
| 832676 | 4/1960 | United Kingdom | 277/53 |
| 1537729 | 1/1979 | United Kingdom . | |
| 2035472A | 6/1980 | United Kingdom . | |

OTHER PUBLICATIONS

Leach, L. L., "Seals for Shaft Housings and Bearings", Product Engineering, Mar. 1932, p. 123.

Primary Examiner—Robert S. Ward
Attorney, Agent, or Firm—Flynn, Thiel, Boutell & Tanis

[57] ABSTRACT

A sealing device employing interfitting relatively rotatable rings, namely a stator and a rotor disposed for cooperation between a housing and a rotatable shaft. The stator is nonrotatably and sealingly engaged within an opening formed in the housing. An elastomeric O-ring maintains a seal between the stator and housing. The rotor snugly surrounds and is nonrotatably carried with the shaft and is provided with elastomeric seal ring therebetween to prevent leakage along the shaft. The stator closely externally surrounds the rotor to define a complex pathway therebetween which inhibits flow of liquids or contaminants in either direction therethrough. This pathway includes a pair of annular collecting chambers disposed in axially spaced relationship, whereby the outer chamber collects and discharges to the environment any contaminants which enter from the environment, and the inner chamber collects and discharges back to the reservoir any lubricant or fluid which enters into the pathway from its inner end.

14 Claims, 2 Drawing Sheets

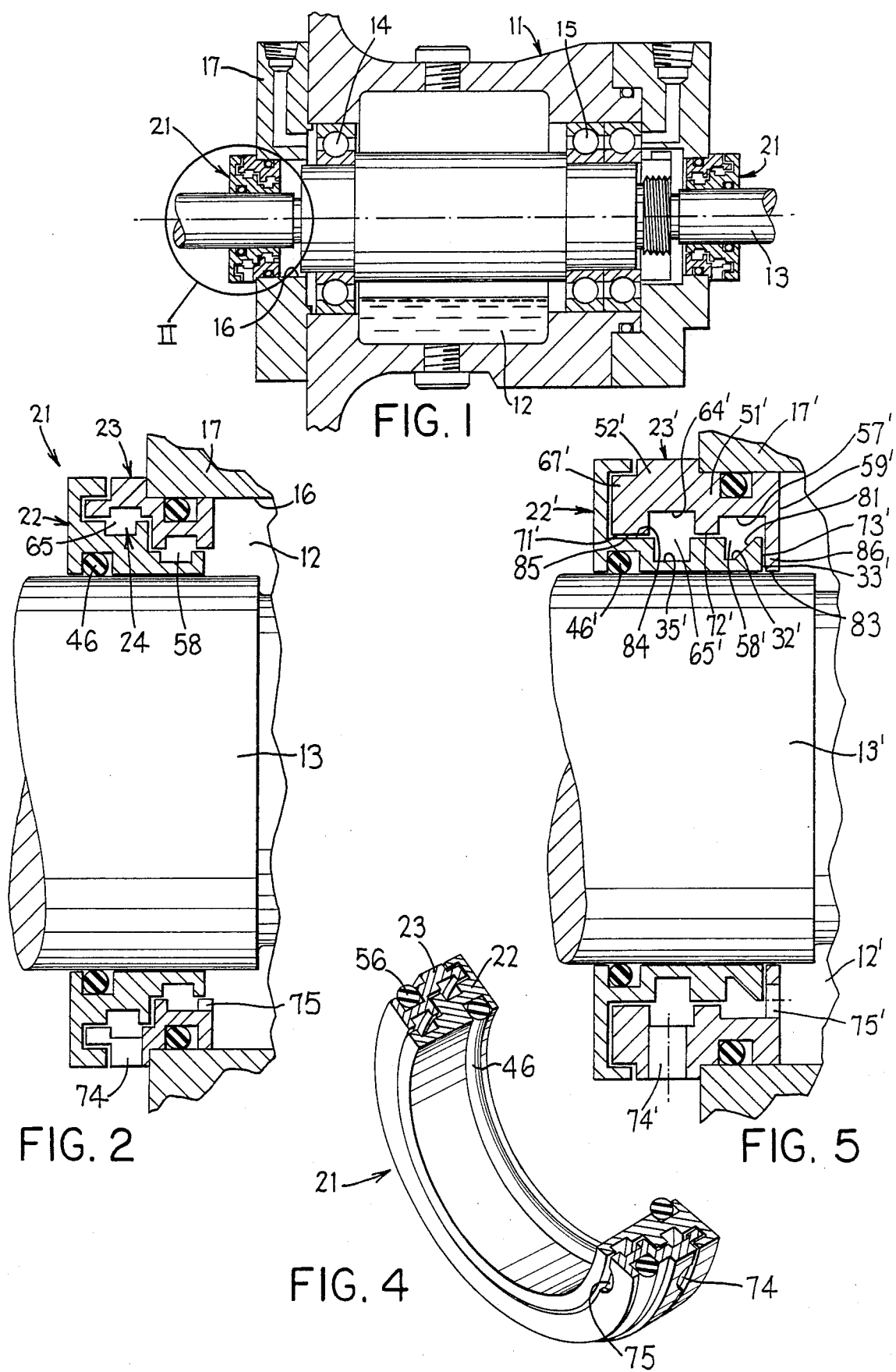

LABYRINTH BEARING PROTECTOR SEAL

FIELD OF THE INVENTION

This invention relates to a device, hereinafter referred to as a bearing protector, for use between a relatively rotatable housing and shaft to prevent flow of either internal or external contaminants axially along the shaft, such as into or away from the region of the bearing.

BACKGROUND OF THE INVENTION

Within most industries, it is important that there be provided some type of seal device which prevents fluids from leaking externally from an associated bearing housing or support, and which also preventing foreign particles in the pumped fluid or environment from working themselves through the seal into the bearing.

While many sealing devices employ various types of elastomeric sealing rings, specifically lip seals, nevertheless such lip seals have a short life since they undergo rapid wear, particularly when used in environments involving fluids of a high temperature, high pressure, abrasive or corrosive characteristic. While lip seals continue to be used in many environments, nevertheless it is well documented and well known to those who are experienced in such technologies that lip seals provide only a relatively short life and hence do not provide a satisfactory solution to the sealing problem presented.

In an attempt to improve upon such problem and the solution thereto, various types of sealing ring devices have been employed. Such sealing ring devices, sometimes referred to as "bearing isolators", typically employ a pair of relatively rotatable rings (i.e. a rotor and a stator) which are respectively fixed to the rotatable shaft and stationary housing. These relatively rotatable rings have a close fitting relationship to create a complex pathway therebetween, such as a labyrinth, to hence greatly inhibit the flow or movement of fluids or contaminants in either direction therebetween. While such sealing devices have proven at least partially effective in selected use conditions, nevertheless one of the disadvantages of any such device has been the extremely complex configuration of the rings, and the consequent cost of such devices. Further, many of these nonsealing devices have been unable to prevent flow of fluids or contaminants therethrough to the desired degree, particularly due to their inability to successfully capture and expel any fluids or contaminants which gain entry into the labyrinth or pathway between the rings.

While numerous sealing devices of this general type have been developed, exemplary embodiments of such devices are illustrated by U.S. Pat. Nos. 2,524,124, 4,484,754, 3,897,072, 4,466,620, 4,572,517, 4,114,902, 4,022,479, 3,893,674 and British specification No. 2035472A.

Accordingly, the present invention relates to a sealing device of the type which employs a pair of interfitting relatively rotatable rings, namely a stator and a rotor, disposed for cooperation between a housing and a shaft rotatable relative thereto, which sealing device is believed to represent a significant improvement over prior art devices of this general type with respect to its improved level of performance, its simplicity and efficiency of manufacture, and its simplicity of installation.

In the improved sealing device of this invention, which device is known as a "bearing protector" or a bearing isolator, the stator is nonrotatably and sealingly engaged within an opening formed in the housing. A sealing relationship is achieved by use of a simple elastomeric O-ring to ensure a proper seal is maintained between the stator and the housing. Similarly, the rotor snugly surrounds and rotates with the shaft and is preferably provided with a conventional elastomeric O-ring therebetween to prevent leakage along the shaft. The stator closely externally surrounds the rotor to define a complex pathway or labyrinth therebetween which inhibits flow of liquids or contaminants in either direction therethrough. This pathway or labyrinth includes a pair of annular collecting chambers disposed in axially spaced relationship, whereby the outer chamber collects and readily discharges to the environment any contaminants which enter from the environment, and the inner chamber collects and discharges back to the reservoir any lubricant or fluid which enters into the pathway from its inner end. The configuration of these contaminant-collecting chambers ensures that the collected contaminants or fluids can be readily discharged back to their source, and at the same time the cooperation between the stator and rotor are such as to severely restrict or prevent flow of the contaminants from one collection chamber to the other.

Other objects and purposes of the invention will be apparent to persons familiar with devices of this general type upon reading the following specification and inspecting the accompanying drawings

BRIEF DESCRIPTION OF THE DRAWINGS

FIG. 1 is a sectional view which diagrammatically illustrates a bearing protector according to the present invention installed at both ends of a bearing housing FIG. 2 is a fragmentary, enlarged sectional view showing the bearing protector cooperating between the bearing housing and shaft, substantially as enclosed within the circle designated II in FIG. 1.

FIG. 4 is a fragmentary perspective view of the bearing protector.

FIG. 5 is a view similar to FIG. 2 but illustrating a variation thereof.

Figure 3:
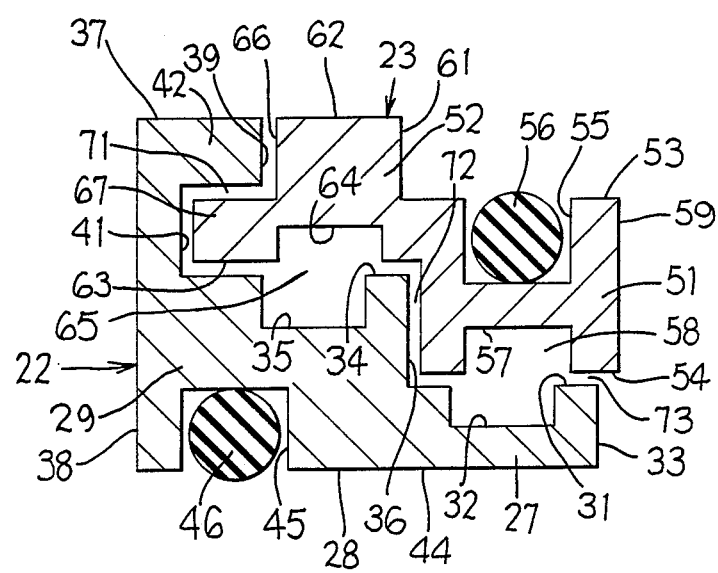
FIG. 3 diagrammatically illustrates, on an enlarged scale, a cross-sectional detail of the bearing protector.

Certain terminology will be used in the following description for convenience in reference only, and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the overall apparatus and designated parts thereof. Said terminology will include the words specifically mentioned, derivatives thereof, and words of similar import.

DETAILED DESCRIPTION

Referring to FIG. 1, there is illustrated a bearing housing 11 which defines a reservoir or compartment 12 therein. A shaft 13, such as a pump shaft, extends through and is rotatably supported on the bearing housing, such as by conventional bearings 14 and 15. The shaft 13 projects outwardly through a suitable cylindrical opening or bore 16 as associated with a detachable end plate 17, the latter being part of the bearing housing.

To prevent external contaminants such as water and the like from gaining access to the bearings, and to additionally prevent the bearing lubricant from escaping externally, the present invention provides a sealing device or bearing protector 21 disposed for cooperation between the rotatable shaft 13 and the stationary housing 11. This bearing protector 21 is normally disposed in fairly close proximity to the bearing, and the design of the bearing protector 21 is such as to effectively prevent contaminants from passing therethrough into contact with the bearing, and similarly to prevent the bearing lubricant from escaping.

The bearing protector 21, as illustrated by FIGS. 2 and 3, basically comprises inner and outer rings which concentrically and relatively rotatably fit one within the other. More specifically, the bearing protector includes a ringlike rotor 22 which closely surrounds and is both sealingly and nonrotatably coupled to the shaft 13. This ringlike rotor 22 in turn is concentrically and closely surrounded by a ringlike stator 23 which is nonrotatably and stationarily secured relative to the surrounding housing 17. The rings 21 and 22 both project at least axially partway into the housing bore 16 substantially as illustrated by FIG. 2. While the rings 22 and 23 closely concentrically surround one another, nevertheless they are slightly spaced apart so as to permit free relative rotation therebetween, and for this purpose the concentric rings define a narrow annular passageway 24 therebetween, the latter involving numerous changes in direction and in effect defining a complex path or labyrinth which effectively prevents the lubricant from passing outwardly therethrough, and at the same time effectively prevents the external contaminants from passing inwardly therethrough.

The rotor 22 is of a stepped configuration and, in the embodiment of FIGS. 1-4, is of a three-step configuration defined by inner, intermediate and outer annular portions 27, 28 and 29, respectively.

The inner annular portion 27 is bounded by an annular outer wall 31. An annular channel-like groove 32 is formed in and projects radially inwardly from the wall 31, this groove 32 being spaced axially outwardly a small distance from the inner axial end face 33 of the rotor.

The intermediate annular portion 28 is also defined within an outer annular wall 34 which is of larger diameter than the outer annular wall 31 of the inner portion 27. This outer annular wall 34 also has an annular channel-like groove 35 formed in and projecting radially inwardly therefrom. This outer annular wall 34 terminates at an inwardly facing axial end surface 36 which is located at the interface between the inner and intermediate portions 27 and 28, respectively.

The outer annular portion 29 is defined by an outer annular wall 37 which is significantly larger in diameter than the outer annular wall 34 of the intermediate portion. In fact, whereas the outer annular walls 31 and 34 are both smaller than the diameter of the housing bore 16 (FIG. 2), this outer annular wall 37 is of a diameter which is significantly larger than the diameter of the housing bore 16. The outer annular portion 29 defines thereon the outer axial end face 38 of the rotor. Outer annular portion 29 also defines thereon an inwardly facing axial end surface 39 which is located at the interface between the annular portions 28 and 29.

The outer annular portion 29 has an annular channel-like groove 41 which projects axially outward from the end surface 39. This groove 41 results in the defining on the outer annular portion 29 of a part 42 which in effect constitutes an annular axially-extending flange which projects axially inwardly toward the housing The rotor 22 has a bore or opening of substantially uniform diameter extending axially therethrough, which bore hence defines the inner annular wall 44. The diameter of this wall 44 is close to but generally slightly larger than the exterior diameter of the shaft 13. An annular channel-like groove 45 is formed in this wall 44 for accommodating therein a conventional elastomeric O-ring 46. This O-ring 46 hence creates a sealed relationship between the shaft 13 and the rotor 22, and in addition results in the rotor 22 being nonrotatably coupled to the shaft 13.

The stator 23 is, in this illustrated embodiment, also of a stepped configuration and includes inner and outer annular portions 51 and 52, respectively.

The inner annular portion 51 is defined between outer and inner annular walls 53 and 54, respectively. The outer annular wall 53 is of a diameter close to but normally slightly less than the diameter of the housing wall defining the bore 16. This outer annular wall 53 has a channel-like annular groove 55 formed therein, which groove accommodates a conventional elastomeric O-ring 56 so as to create a sealed relationship between the stator 23 and the housing member 17.

The inner annular portion 51 also has a channel-like groove 57 which is formed in and projects radially outwardly from the inner annular wall 54 thereof. This channel-like groove 57 is disposed generally radially opposite and in surrounding relationship to the channel-like groove 32 formed in the rotor, whereby these opposed channel-like grooves 32 and 57 hence cooperate so as to define an annular channel 58 between the stator and rotor, which channel is of significant cross section both radially and axially. The purpose of channel 58 is explained hereinafter.

The stator, at its inner axial end, is defined by an inner axial end face 59, the latter being the inner end of the annular portion 51.

The outer annular portion 52 of the stator is also defined between outer and inner annular walls 62 and 63, respectively. The outer annular wall 62 terminates at an inwardly facing axial end surface 61 which defines the interface between the inner and outer annular portions 51 and 52. This end surface 61 in effect defines a shoulder or stop which abuts against the outer face of the housing member 17 for permitting proper positioning of the bearing protector 21 relative to the housing.

The inner annular surface 63 of the portion 52 has an annular channel-like groove 64 formed therein and opening radially outwardly thereof. This channel-like groove 64 is disposed directly radially opposite and in surrounding relationship to the channel-like groove 35. These opposed grooves 35 and 64 hence define an annular channel 65 between the stator and rotor, which channel is of significant cross section both axially and radially. The purpose of this channel 65 is also explained hereinafter.

The outer annular portion 52 of the stator defines thereon an outer axial end face 66, the latter being adapted for disposition closely adjacent and directly opposite the inner surface 39 of the rotor. This outer annular portion 52 of the stator also has an annular flange 67 which is formed integrally therewith and projects axially outwardly from the end face 66 at a location spaced radially inwardly from the outer annular wall 62 thereof. This annular flange 67 is disposed so as to project into the annular groove 41 formed in the rotor. This flange 67 has a cross section which closely conforms to the groove 41 but is spaced slightly from the walls thereof to permit free relative rotation between the stator and rotor.

The concentric interfitting relationship between the stator 23 and rotor 22 results in the defining of the pathway 24 (FIG. 2) therebetween, which pathway at its outer end communicates with the surrounding environment, and at its inner end communicates with the interior of the bore 16 in the vicinity of the adjacent bearing. This pathway 24 includes, at the outer end thereof, a passageway 71 (FIG. 3) which extends from the outside of the bearing protector to the channel 65. This passageway 71 is narrow throughout its length, and passes radially inwardly past the radial end face 66 of the stator, and thence outwardly, downwardly and inwardly around the flange 67, prior to communication with the channel 65. This complex contour of the passageway 71, including the three rather sharp turns and the flow reversal created by the flange 67, hence makes it difficult for contaminates, such as water, to pass therethrough into the channel 65. If water or other contaminants do gain access to the channel 65 through the passageway 71, then the rotation of the rotor 22 and the effect of centrifugal force causes the contaminant to be thrown outwardly into the channel-like groove 64, from which the contaminant then drains outwardly from the groove through a drain slot or opening 74 (FIG. 2) which extends radially through the wall of the outer stator portion 52 for communication with the bottom side of the groove 64. This drain opening 74 discharges externally of the housing.

The pathway 24 also includes a narrow annular passage 73 (FIG. 3) which is defined between the opposed surfaces 31 and 54, which passageway 73 extends axially between the channel 58 and the reservoir or compartment 12. The radial width of this passageway 73 is very small and this hence tends to restrict flow of lubricant therethrough into the compartment 58. However, if any lubricant does gain access into the compartment 58, then the rotation of the rotor 22 causes the lubricant to be thrown radially outwardly by centrifugal force so as to collect within the groove 57 formed in the stator. This groove 57, as its lowermost or bottom point as illustrated in FIG. 2, communicates with the compartment 12 through a small drain hole or slot 75 which opens axially through the end face 59.

To minimize the chance of lubricant or contaminant flowing between the channels 58 and 65, the portion 72 of the pathway 24 which extends between these channels is generally Z-shaped substantially as illustrated by FIG. 3. Further, the outer channel 65 is displaced radially outwardly from the rotational axis of the shaft by a distance which is greater than the radial spacing of the channel 58 from the shaft axis, whereby the Z-shaped intermediate passageway 72 hence has a middle leg which, as it extends from the inner channel 58 to the outer channel 65, projects radially outwardly. Thus, any external contaminant such as water within the channel 65 cannot freely pass into the channel 58 since the rotational centrifugal force effect created by rotation of the rotor 22 always tends to pump the contaminants radially outwardly of the passageway 72 so as to maintain such contaminants within the outer channel 65, from which they can be discharged through the drain hole 74.

OPERATION

While the operation of the invention has been briefly described above, nevertheless same will be summarized to ensure a complete understanding thereof.

During rotation of the shaft 13 relative to the housing 11, the lubricant associated with the bearing and/or the fluids associated with the interior compartment 12 can be positively maintained interiorly of the housing due to the presence of the bearing protector 21. The rotation of the rotor 22 along with the shaft 13, and the close interfitting relationship of the rotor 22 within the stator 23, is such as to severely restrict any outward flow of lubricant or fluid through the pathway 24, and in fact is such as to cause any such fluid or lubricant to be drained back to the interior compartment 12. For example, any lubricant which passes through the passageway 73 will become trapped within the channel 58 due to the rather large size of this channel. Further, the rotation of the rotor 22 causes any trapped lubricant or fluid to be thrown outwardly of the channel 58 into the outer groove 57 defined in the stator, from which the lubricant flows downwardly into the bottom part of this groove 57 and thence flows axially inwardly through the drain hole 75 back into the inner compartment 12. Any tendency for the fluid or lubricant to escape outwardly of the pathway 24 from the channel 58 is further resisted by the narrow Z-shaped passageway 72.

With respect to any attempt by external contaminants such as water to pass inwardly through the pathway 24, any such inward passage is initially resisted by the narrow passageway 71 and the configuration thereof, specifically the numerous turns and reverse flow caused by this passageway. Further, the rotation of the rotor wall defining the bottom of the groove 41, and its closeness to the axial end wall of the annular stator flange 67, also creates a centrifugal force effect which tends to force any fluid or contaminants in the passageway 71 radially outwardly, and thus further resists any tendency for external contaminants to flow inwardly along the passageway 71. In the event that any such external contaminants, such as water, do successfully flow through the passageway 71, then they become trapped in the enlarged annular chamber 65. Again, the centrifugal force effect created by the rotor 22 causes these contaminants to collect in the outer groove 64 of the stator, from which they flow downwardly into the bottom portion of this groove and then are discharged outwardly by gravity through the bottom drain hole 74 whereby they are thus again discharged back to the surrounding environment. Any tendency for the contaminants such as water to continue to flow inwardly through the pathway 24 beyond the channel 65 is resisted by the Z-shaped configuration of the intermediate passageway 72 and specifically the outward centrifugal effect achieved within this passage due to the rotation of the rotor.

Hence, the bearing protector of this invention assures positive lubrication of the bearing and at the same time can successfully prevent access of contaminants to the bearing, whereby positive lubrication and hence long life of the bearing can be achieved. The pathway 24 between the rotor 22 and stator 23 provides an additional significant function in that it defines an outlet so as to eliminate any potential pressure buildup which may occur within the lubricant associated with the bearing, whereby a separate pressure release opening (a typical source of contamination) can hence be eliminated.

FIG. 5 illustrates therein a variation of the bearing protector 21' according to the present invention. Accordingly, corresponding parts have been designated by the same reference numerals but with the addition of a prime (') thereto.

The bearing protector 21' illustrated by FIG. 5 again utilizes a rotor 22' and stator 23' which cooperate with one another and interfit between the shaft and housing in a manner substantially corresponding to that as described above relative to the FIG. 2 embodiment. In this variation of FIG. 5, the rotor 22' is of a two-step configuration than a three-step configuration as shown by 52. This is achieved by defining the inner and intermediate portions of the same diameter as defined by the outer annular wall 84, which wall has axially-spaced annular channel-like grooves 35' and 32' formed therein.

The stator 23' is basically of a three-step configuration, with the outer and intermediate annular portion 52' and 51' respectively having a uniform bore extending coaxially inwardly thereof so as to define an inner annular wall 85 of uniform diameter, the latter being disposed in close surrounding relationship to the outer annular wall 84 on the stator. These portions 51' and 52' again define the axially spaced channel-like grooves 57' and 64' therein so as to respectively cooperate and partially define the channels 58' and 65'. The channel-like groove 64', however, penetrates radially outwardly to a greater depth than the groove 57' so as to provide for a more positive collection of contaminants within the channel 65' and the external discharge thereof, thereby providing a more positive assurance that external contaminants cannot flow inwardly between the stator and rotor for access to the interior compartment 12'.

The stator 23', however, does include the third annular portion, namely the inner annular portion 86. This latter portion defines thereon the inner axial end face 59', and in addition projects radially inwardly so as to closely radially overlap the axial end face 33' of the rotor. In fact, this inner annular portion 86 in effect defines a radially inwardly projecting flange which closely radially overlaps the inner end of the rotor and projects radially inwardly so as to terminate in an inner annular surface 83 which closely concentrically surrounds the periphery of the rotatable shaft 13'. Hence, the passageway 73' which exists between the inner compartment 12' and the channel 58' is now of a generally L-shaped configuration which includes both a short horizontal leg extending directly along the periphery of the shaft and a radially projecting leg defined between the annular portion 86 and the adjacent end face 33' of the rotor. This configuration of the passageway 73' further restricts any attempt of the lubricant to gain access to the channel 58'. This latter channel is also preferably provided with the one side wall 81 thereof, namely the side wall disposed closest to the inner compartment 12', sloped axially inwardly as it projects radially outwardly. Hence, due to the effect of centrifugal force caused by rotation of the rotor 22', coupled with the slope of this side wall 81, any lubricant which gains access to and is trapped in the channel 58' is hence forced radially outwardly and the slope of this side wall 81 tends to direct the trapped lubricant radially outwardly and at the same time axially inwardly so that it can be readily discharged through the drain hole 75' back into the inner compartment 12'.

With the improved bearing protector 21 or 21' according to the present invention, assembly of the bearing protector in association with the shaft and housing can be easily and readily achieved. For example, the stator 23 or 23' is initially sealingly positioned within the outer end of the bearing housing opening 16 until the shoulder 61 abuts a front face of the bearing housing. The rotor 22 or 22' can then be concentrically slid onto and along the shaft 13 or 13' and into the mating rotor so as to assume an assembled position substantially as illustrated by FIGS. 2 or 5. Upon startup, the rotor will automatically axially space or "set" itself.

The rotor and stator are each constructed as continuous one-piece rings, preferably of bronze. However, the rotor and stator can also be constructed of other materials, such as stainless steel or other non-metallic materials in order to meet special requirements.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property of privilege is claimed are defined as follows:

1. In combination, a shaft rotatable about its longitudinally extending axis, a housing disposed in surrounding relationship to the shaft and defining therein a cylindrical bore which concentrically surrounds the shaft, bearing means coacting between said housing and said shaft for rotatably supporting said shaft, and a bearing protector associated with said cylindrical bore at a location spaced axially outwardly from said bearing means and coacting between said shaft and said housing for sealingly isolating the bearing means from a region which is disposed exteriorly of the bearing protector, said bearing protector including a one-piece ring-shaped rotor sealingly and nonrotatably carried on said shaft and disposed for cooperation with a one-piece ring-shaped stator which is sealingly and nonrotatably mounted on said housing at least partially within said cylindrical bore, comprising:

said stator being disposed radially in concentric and surrounding relationship to said rotor, said stator and rotor respectively having first and second annular surface means formed thereon and disposed in concentric and closely adjacent relationship to one another so as to define therebetween an elongate annular pathway which extends axially over a significant extent and at its inner end communicates with a bearing compartment and at its outer end communicates with the exterior region;

said pathway including an inner passageway which is of very narrow width as defined between opposed portions of said first and second annular surface means for inhibiting flow therethrough, said inner passageway having a length which exceeds its width and defining the inner end of said pathway for direct communication with the bearing compartment;

said pathway including an outer passageway which is of extremely narrow width as defined between opposed portions of said first and second annular surface means for inhibiting flow therethrough, said outer passageway having a length which exceeds its width and defining the outer end of said pathway for direct communication with the exterior region;

said pathway including means defining a first annular channel of enlarged radial and axial cross-sectional dimensions for collecting therein lubricant which tends to escape from said bearing compartment, said first channel being disposed for communication between the inner and intermediate passageways, said first channel being defined by a radially opposed pair of first channel-like grooves which are formed in said stator and rotor and which project respectively radially outwardly and inwardly from the respective first and second annular surface means;

said stator having first drain opening means formed therein adjacent a lower side thereof for providing communication between said bearing compartment and the radially outermost portion of the first channel-like groove as defined in said stator;

said pathway including means defining a second annular channel of enlarged radial and axial cross-sectional dimensions for collecting therein contaminants which flow into the pathway from the exterior region, said second channel being disposed for communication between the outer and intermediate passageways, said second channel also being positioned axially outwardly from said first channel and separated therefrom by said intermediate passageway, said second channel being defined by a radially opposed pair of second channel-like grooves as defined in said stator and rotor, said pair of second channel-like grooves extending radially outwardly and inwardly relative to the respective first and second annular surface means;

said stator having second drain opening means formed in a lower portion thereof and providing communication between said exterior region and the radially outer portion of the second channel-like groove as defined in said stator;

said stator including at least axially inner and outer annular portions, said inner annular portion being closely seated within the housing bore, said stator also defining thereon an axially inwardly facing shoulder at the interface between said inner and outer annular portions so that said shoulder abuts an external front face of said housing when said stator is mounted thereon; and said outer passageway being defined in part by an axially extending annular groove formed in one of said stator and rotor and an axially extending annular flange which is formed on the other of said stator and rotor and is closely accommodated within said annular groove so that said outer passageway includes a generally U-shaped path having generally parallel axially-extending legs which are radially spaced apart so that flow through said outer passageway requires flow through one said leg in one axial direction followed by flow through the other said leg in an opposite axial direction.

2. A combination according to claim 1, wherein each of said first and second channels are defined between maximum and minimum diameters, wherein said inner and intermediate passagewys respectively communicate with axially opposite sides of said first channel at positions which are spaced radially from and between the maximum and minimum diameters of said first channel, and wherein said outer and intermediate passageways respectively communicate with axially opposite sides of said second channel at positions which are spaced radially from and between the maximum and minimum diameters of said second channel.

3. A combination according to claim 1, wherein said second channel has a maximum diameter which is greater than the maximum diameter of said first channel, and wherein one of the axially-extending legs of said U-shaped path communicates directly with said second channel and projects axially outwardly therefrom.

4. A bearing protector spaced axially from a bearing means and coacting between a rotatable shaft and a surrounding housing for sealingly isolating the bearing means from a region disposed exterior of the bearing protector, said bearing protector comprising:

a one-piece ring-shaped rotor adapted to be sealingly and nonrotatably carried on said shaft in surrounding relationshiip thereto, and a one-piece ring-shaped stator adatped to be sealingly and nonrotatably mounted on said housing;

said stator being disposed radially in concentric and surrounding relationship to said rotor, said stator and rotor respectively having first and second annular surface means formed thereon and disposed in concentric and closely adjacent relationship to one another so as to define therebetween an elongate annular pathway which extends axially over a significant extent and at its inner end communicates with a bearing compartment and at its outer end communicates with the exterior region;

said pathway including an inner passageway which is of very narrow width as defined between opposed portions of said first and second annular surface means for inhibiting flow therethrough, said inner passageway having a length which exceeds its width and defining the inner end of said pathway for direct communication with the bearing compartment;

said pathway including an outer passageway which is of extremely narrow width as defined between opposed portions of said first and second annular surface means for inhibiting flow therethrough, said outer passageway having a length which exceeds its width and defining the outer end of said pathway for direct communication with the exterior region;

said pathway including an intermediate passageway which is of very narrow width and is defined between opposed portions of said first and second annular surface means for inhibiting flow therethrough, said intermediate passageway having a length which exceeds its width;

said pathway including means defining a first annular channel of enlarged radial and axial cross-sectional dimensions for collecting therein lubricant which tends to escape from said bearing compartment, said first channel being disposed for communication between the inner and intermediate passageways, said first channel being defined by a radially opposed pair of first channel-like grooves which are formed in said stator and rotor and which project respectively radially outwardly and inwardly from the respective first and second annular surface means so that said first channel is defined between maximum and minimum diameters, said inner and intermediate passageways respectively communicating with axially opposite sides of said first channel at positions which are spaced radially from and between the maximum and minimum diameters of said first channel;

said stator having first drain opening means formed therein adjacent a lower side thereof for providing communication between said bearing compartment and a radially outermost portion of the first channel-like groove as defined in said stator;

said pathway including means defining a second annular channel of enlarged radial and axial cross-sectional dimensions for collecting therein contaminants which flow into the pathway from the exterior region, said second channel being disposed for communication between the outer and intermediate passageways, said second channel also being positioned axially outwardly from said first channel and separated therefrom by said intermediate passageway, said second channel being defined by a radially opposed pair of secolnd channel-like grooves which are formed in said stator and rotor and which project respectively radially outwardly and inwardly from the respective first and second annular surface means so that said second channel is defined between maximum and minimum diameters, said outer and intermediate passageways respectively communicating with axially opposite sides of said second channel at positions which are spaced radially from and between the maximum and minimum diameters of said second channel; and said stator having second drain opening means formed in a lower portion thereof for providing communication between a radially outer portion of the second channel-like groove as defined in said stator and said exterior region.

5. A bearing protector according to claim 4, wherein said stator includes axially inner and outer annular portiolns, said stator defining thereon an axially inwardly facing shoulder at the interface between said inner and outer annular portiolns, said axially inwardly facing shoulder projecting radially outwardly beyond the outer diameter of the axially inner annular portion so as to abut against a face on the housing.

6. A bearing protector according to claim 4, wherein said outer passageway is defined at least in part by an axially extending annular groove formed in said rotor and an axially extending annular flange which is formed on said stator and which is closely accommodated within said annular groove so that said outer passageway includes a substantially U-shaped path having radially spaced legs which require flow therethrough in opposite directions.

7. A bearing protector according to claim 6, wherein said intermediate passageway has a generally Z-shaped configuration and includes a first end passage which projects axially for direct communication with said first channel, a second end passage which projects axially for direct communication with said second channel, and a middle passage which extends radially outwardly from said first end passage to said second end passage.

8. In combination, a shaft rotatable about its longitudinally extending axis, a housing disposed in surrounding relationship to the shaft and defining therein a cylindrical bore which concentrically surrounds the shaft, bearing means coacting between said housing and said shaft for rotatably supporting said shaft, and a bearing protector associated with said cylindrical bore at a location spaced axially outwardly from said bearing means and coacting between said shaft and said housing for sealingly isolating the bearing means from a region which is disposed exteriorly of the bearing protector, said bearing protector including a ring-shaped rotor sealingly and nonrotatably carried on said shaft and disposed for cooperation with a ring-shaped stator which is sealingly and nonrotatably mounted on said housing at least partially within said cylindrical bore, comprising:

said stator being disposed radially in concentric and surrounding relationship to said rotor, said stator and rotor respectively having first and second annular surface means formed thereon and disposed in concentric and closely adjacent relationship to one another so as to define therebetween an elongate annular pathway which extends axially over a significant extent and at its inner end communicates with a bearing compartment and at its outer end communicates with the exterior region;

said pathway including an inner passageway which is of very narrow width as defined between opposed portions of said first and second annular surface means and which defines the inner end of said pathway for direct communication with the bearing compartment;

said pathway including an outer passageway which is of extremely narrow width as defined between opposed portions of said first and second annular surface means and which defines the outer end of said pathway for direct communication with the exterior region;

said pathway including an intermediate passageway which is of very narrow width and is defined between opposed portions of said first and second annular surface means;

said pathway including means defining a first annular channel of enlarged radial and axial cross-sectional dimensions for collecting therein lubricant which tends to escape from said bearing compartment, said first channel being disposed for communication between the inner and intermediate passageways, said first channel being defined by a radially opposed pair of first channel-like grooves which are formed in said stator and rotor and which project respectively radially outwardly and inwardly from the respective first and second annular surface means;

said stator having first drain opening means formed therein adjacent a lower side thereof for providing communication between said bearing compartment and the radially outermost portion of the first channel-like groove as defined in said stator;

said pathway including means defining a second annular channel of onlarged radial and axial cross-sectional dimensions for collecting therein contaminants which flow into the pathway from the exterior region, said second channel being disposed for communication between the outer and intermediate passageways, said second channel also being positioned axially outwardly from said first channel and separated therefrom by said intermediate passageway, said second channel being defined by a radially opposed pair of second channel-like grooves as defined in said stator and rotor, said pair of second channel-like grooves extending radially outwardly and inwardly relative to their respective first and second annular surface means;

said stator having second rain opening means formed in a lower portion thereof and providing communication between said exterior region and the radially outer portion of the second channel-like groove as defined in said stator;

said stator including at least axially inner and outer annular portions, said inner annular portion being closely seated within the housing bore, said inner annular portion having an annular groove formed therearound and an elastomeric seal ring disposed within said groove and maintained in sealing engagement with the wall of said housing bore;

said stator defining thereon an axially inwardly facing shoulder at the interface between said inner and outer annular portions so that said shoulder abuts an external front face of said housing when said stator is mounted thereon; and said outer passageway being defined in part by an axially-extending annular flange which is formed on the outer portion of said stator and projects axially outwardly thereof, and an axially-extending annular groove which is formed in said rotor and closely accommodates the annular flange therein so that the outer passageway includes portions which require flow therethrough in opposite directions, the rotor defining thereon an axially-inwardly projecting annular lip which is positioned radially outwardly of and projects in axially overlapping relationship relative to said flange.

9. A combination according to claim 8, wherein said second channel has a radially outer boundary wall as defined by the second groove on said stator which is of larger diameter than the radially outer boundary wall of said first channel as defined by the first groove on said stator.

10. A combination according to claim 1, wherein said outer passageway is defined in part by an axially extending annular groove formed in one of said stator and rotor and an axially extending annular flange which is formed on the other of said stator and rotor and is closely accommodated within said annular groove so that said outer passageway includes portions which require flow therethrough in opposite directions.

11. A combination according to claim 9, wherein said intermeidate passageway has a generally Z-shaped configuration and includes a first end passage which projects axially for direct communication with said first channel, a second end passage which projects axially for communication with said second channel, said second end passage being positioned radially outwardly from said first end passage, and a middle passage which extends radially between said first and second end passages.

12. A combination according to claim 8, wherein said rotor has a uniform diameter cylindrical bore extending therethrough, said uniform diameter being slightly greater than the diameter of said shaft, said rotor having an annular groove formed in surrounding relationship to said inner bore and containing an elastomeric sealing ring therein for sealing engagement with the exterior diameter of the shaft.

13. A combination according to claim 12, wherein said rotor includes axially inner, intermediate and outer annular portions which are progressively of larger outer diameter, the first groove as associated with said rotor being formed in said inner portion, said second groove as associated with said rotor being formed in said intermediate portion, and said axially-extending annular groove being formed in said outer annular portion; and said stator having the inner and outer annular portions thereof disposed in concentric and surrounding relationship to the respective inner and intermediate annular portions of said rotor.

14. A combination according to claim 12, wherein said rotor has axially inner and outer annular portions, said first and second channel-like grooves as defined in said rotor being formed in said inner annular portion, said axially-extending annular groove being formed in said outer annular portion; and said stator having the inner and outer annular portions thereof disposed in concentric and surrounding relationship to the inner annular portion of said rotor, and said stator having at the radially inner end thereof a radially inwardly projecting annular flange which is disposed axially inwardly of and closely radially overlaps the axially inner end of said rotor.

* * * * *

UNITED STATES PATENT AND TRADEMARK OFFICE
CERTIFICATE OF CORRECTION

PATENT NO. : 4 743 034
DATED : May 10, 1988
INVENTOR(S) : Kenneth G. KAKABAKER et al It is certified that error appears in the above-identified patent and that said Letters Patent is hereby corrected as shown below:

Column 8, Between Lines 66 and 67; Insert the following paragraph:
    ---said pathway including an intermediate passageway which is of very narrow width and is defined between opposed portions of said first and second annular surface means for inhibiting flow therethrough, said intermediate passageway having a length which exceeds its width;---.

Column 9, Line 60; Change "passagewys" to ---passageways---.

Column 10, Line 15; Change "relationshiip" to ---relationship---.

Column 10, Line 16; Change "adatped" to ---adapted---.

Column 11, Line 16; Change "secolnd" to ---second---.

Column 11, Lines 34 and 35; Change "portiolns" to ---portions---.

Column 11, Line 37; Change "portiolns" to ---portions---.

Column 12, Line 52; Change "onlarged" to ---enlarged---.

Column 12, Line 66; Change "rain" to ---drain---.

Column 13, Line 33; Change "Claim 1" to ---Claim 9---.

Column 13, Line 42; Change "intermeidate" to ---intermediate---.

Signed and Sealed this

Eighteenth Day of October, 1988

Attest:

DONALD J. QUIGG

Attesting Officer    Commissioner of Patents and Trademarks